United States Patent
Baeuerle et al.

(10) Patent No.: US 8,071,052 B2
(45) Date of Patent: Dec. 6, 2011

(54) FLUID HANDLING ASSEMBLY WITH VALVE POSITION CONTROL BASED ON FLUID AMOUNT MEASUREMENT

(75) Inventors: Martin Baeuerle, Buehlertal (DE); Friedhelm Koch, Karlsruhe (DE); Bodo Schakols, Rheinstetten (DE)

(73) Assignee: Agilent Technologies, Inc., Santa Clara, CA (US)

( * ) Notice: Subject to any disclaimer, the term of this patent is extended or adjusted under 35 U.S.C. 154(b) by 1316 days.

(21) Appl. No.: 11/321,033

(22) Filed: Dec. 29, 2005

(65) Prior Publication Data
US 2006/0222571 A1 Oct. 5, 2006

(30) Foreign Application Priority Data
Mar. 29, 2005 (EP) .................................... 05102471

(51) Int. Cl.
*B01L 3/00* (2006.01)

(52) U.S. Cl. ........ 422/503; 422/500; 422/501; 422/502; 436/180; 73/61.55

(58) Field of Classification Search .................... 422/69, 422/100, 103, 500–503; 436/161, 180; 73/61.55
See application file for complete search history.

(56) References Cited

U.S. PATENT DOCUMENTS

| 4,262,689 | A | * | 4/1981 | Rodder | 137/246.12 |
| 5,806,565 | A | | 9/1998 | Kadlicko | 137/625.63 |
| 6,143,248 | A | | 11/2000 | Kellogg et al. | 422/72 |
| 6,958,119 | B2 | * | 10/2005 | Yin et al. | 210/198.2 |
| 7,032,605 | B1 | * | 4/2006 | Dority | 137/1 |
| 2001/0045137 | A1 | * | 11/2001 | Birchenough et al. | 74/335 |
| 2005/0016605 | A1 | | 1/2005 | Sherman et al. | 137/625.33 |

FOREIGN PATENT DOCUMENTS

WO  WO 97/05417  2/1997

* cited by examiner

Primary Examiner — Jyoti Nagpaul

(57) ABSTRACT

An assembly for handling a fluid, comprising a valve and a controller. The valve has at least one revolving valve element and a coupling device. The coupling device comprises at least one port coupled to a flow path and is adapted for interacting with said at least one revolving valve element in order to control a fluid flow through said at least one port using a relative valve position between the revolving valve element and the coupling device. The controller is adapted for controlling the relative valve position based on at least one of a current and a previous measurement of an amount of the fluid flow dependent on the relative valve position.

11 Claims, 7 Drawing Sheets

FLUID HANDLING ASSEMBLY WITH VALVE POSITION CONTROL BASED ON FLUID AMOUNT MEASUREMENT

BACKGROUND ART

The present invention relates to a fluid handling assembly, in particular as a part of a microfluidic processing system.

The field of microfluidic laboratory technology comprises chemical, physical and/or biological analysis, separation or synthesis of substances on a substrate with a microfluidic structure. There is a growing demand for such microfluidic processing systems that has generated a need for small fluidic valves. Such miniaturized microfluidic devices have to fulfill a variety of requirements such as low dead volume and short flow paths with a cross section as constant as possible. A sufficient approach in the field is the use of microfluidic chips coupled to revolving valve elements for flow controlling the microfluidic processes executed within the chip. One solution for a flexible microfluidic chip is disclosed for example in the U.S. Pat. No. 5,500,071. One solution for such a revolving valve element is disclosed for example in EP 1 520 837.

SUMMARY OF THE INVENTION

It is an object of the invention to provide an improved functionality of such a fluid handling assembly, in particular by using an improved adjustment of the relative valve position. The object is solved by the independent claims. Preferred embodiments are shown by the dependent claims.

According to the embodiments of the invention, the relative valve position is controlled based on at least one of current and previous measurement of an amount of the fluid flow dependent on the relative valve position. With help of the data of such a previous measurement a desired relative valve position can easily be adjusted with high exactness. Such a previous measurement may be provided by any suitable procedure. Preferably, a calibrating procedure may be used to perform said previous measurement and to provide said previous measurement data.

In order to control microfluidic processes executed within a microfluidic chip a revolving valve element moves relative to the microfluidic chip. The resulting relative valve position defines the fluid flow to, from and within the microfluidic chip. Since the microfluidic processes operate with high fluidic pressures and very small volumes, e.g. in the range of micro-liters or even nano-liters, the performance of the microfluidic processes usually depends on the quality of adjusting the correct relative valve positions. By performing the adjustment based on a previous measurement the quality of the relative valve positions and thus the quality of the microfluidic processes can be improved.

According to embodiments the assembly comprises an actuator drive coupled to the at least one moveable valve element using a drive chain adapted to actuate the at least one moveable valve element. Such a drive chain automatically includes manufacturing tolerances. Since the drive chain comprises several interactive components the tolerances result in a tolerance chain. The use of the previous measurement for controlling the relative valve position allows reducing or eliminating of the tolerance chain. To this end the previous measurement considers an off-set of the actuator, wherein said off-set is defined by a deviation between an actual value and a target value of a relationship between a relative actuator position and the relative valve position.

According to other embodiments a method for performing the previous measurement of for providing the previous measurement data, in particular a calibration procedure, comprises determining for the moveable valve element at least one of an actual open range and an actual seal range. Said actual open range is characterized by relative valve positions, in which the amount of the fluid flow is higher than a predetermined upper threshold. Said actual seal range is characterized by relative valve positions, in which the amount of fluid flow is lower than a predetermined lower threshold. Therefore, the different actual ranges can be determined by comparing the measured amount of the fluid flow with said thresholds. A controller of the fluid handling assembly is preferably adapted for determining the off-set of the actuator mentioned above by at least one of comparing an actual open range with a target open range of the moveable valve element and comparing the actual seal range with a target seal range of the moveable valve element. As mentioned above a tolerance chain established between the actuator and the moveable valve element can be reduced or eliminated by considering said off-set.

According to other embodiments the functionality of the assembly can be improved by determining malfunctions of at least one of the valve and a coupling device interacting with said valve or said moveable valve element, respectively. The controller of the assembly is adapted for automatically determining such malfunctions. Since said malfunctions are characterized by deviations between an actual relationship and a target relation ship between the amount of the fluid flow and the relative valve position. As mentioned above, the controller is adapted for determining said actual relationship between the amount of the fluid flow and the relative valve position. The target relationship between the amount of the fluid flow and the relative valve position is preferably stored within a suitable storage. Said target relationship is preferably defined by the previous measurement or the previous measurement data, respectively. Accordingly, deviations between the actual relationship and the target relationship indicate malfunctions of the valve and/or the coupling device. The quality of the fluid handling process, in particular of the microfluidic process, performed by the assembly, is improved, since occurring malfunctions can be detected and signalized.

According to other embodiments the controller is adapted for identifying actual malfunctions by comparing the actual relationship with stored malfunction relationship deviating from the target relation ship. Therefore, the controller is enabled to automatically identify at least one, preferably several, predetermined malfunctions. Maintenance of the assembly is simplified, since malfunction are identified.

Embodiments also relate to a fluid separation system adapted for separating compounds of a fluid. Said system comprises a fluid provider adapted for providing the fluid, a separation unit adapted for separating compounds of the fluid, and the fluid handling assembly mentioned above. The quality of the fluid separation performed by said system is improved, since the assembly uses the previous measurement for controlling the fluid flow.

Other embodiments further relate to a flexible test chip adapted for using with the assembly mentioned above or adapted for using in the system mentioned above. Said test chip is adapted for diagnosing a moveable valve element adapted for controlling at least one port of a coupling device. Preferably the coupling device is designed as a flexible microfluidic chip provided with at least one port and at least one microfluidic channel connected to the port. The design of the microfluidic chip depends on the microfluidic process to be performed by said microfluidic chip. Since the test chip does not depend on the microfluidic processes to be performed by the microfluidic chip said test chip can easily be adapted for several requested diagnostic purposes. In particular, the test chip can easily be adapted for diagnosing procedures which cannot be performed using a conventional microfluidic chip.

Embodiments also relate to a method for handling a fluid in the assembly mentioned above, wherein the method comprises controlling the relative valve position based on at least one of a current and a previous measurement of an amount of the fluid flow depending on the relative valve position.

Further embodiments relate to a software program or to a software product, which is preferably stored on a data carrier and which is designed for controlling or executing the method mentioned above, when run on a data processing system such as a computer.

Preferred embodiments of the assembly the assembly (4) might comprise a fluid supply adapted for supplying a fluid under pressure to the at least one port or to the valve (11). In other embodiments, the controller can be adapted for determining an actual relationship between the amount of the fluid flowing through the at least one port and the relative valve position. In another embodiment, the controller is adapted for evaluating a determined actual relationship between the amount of the fluid flowing through the at least one port and the relative valve position for diagnostic purposes.

In one embodiment, the controller is adapted for comparing the amount of the fluid flow with at least one of an upper threshold and a lower threshold. In another embodiment, the controller is adapted for determining for the revolving valve element at least one of an actual open range and an actual seal range, wherein said actual open range is characterized by relative valve positions, in which the amount of the fluid flow is higher than said upper threshold, wherein said actual seal range is characterized by relative valve positions, in which the amount of fluid flow is lower than said lower threshold. In another embodiment, the controller is adapted for determining an off-set of an actuator by at least one of comparing an actual open range with a target open range of the revolving valve element and comparing the actual seal range with a target seal range of the revolving valve element.

In one embodiment, the controller is adapted for comparing the amount of the fluid flow with a leakage threshold within a range of relative valve positions in which a sealing range is expected, wherein the leakage threshold preferably is the lower threshold.

The coupling device preferably is a microfluidic device. The fluid preferably is a liquid or a gas.

Embodiments might comprise one or more of the following features. The at least one revolving valve element comprises an interface with the coupling device. The coupling device comprises at least one inlet port coupled to a first flow path of the coupling device. The coupling device comprises at least one outlet port coupled to a second flow path of the coupling device. The coupling device comprises at least two connecting ports, namely at least one connecting port coupled to a first flow path and at least one connecting port coupled to a second flow path. The at least one revolving valve element comprises at least one fluid conducting feature adapted for controlling the at least one port depending on the relative valve position of the respective revolving valve element. The at least one fluid conducting feature is adapted for coupling a first connecting port to a second connecting port depending on the relative valve position of the respective revolving valve element.

Embodiments might comprise one or more of the following features. The controller is adapted for determining malfunctions of at least one of the valve and the coupling device, such malfunctions being characterized by deviations between an actual relationship and a target relationship between the amount of the fluid flow and the relative valve position. The controller is adapted for identifying determined malfunctions by comparing an actual relationship between the amount of the fluid flow and the relative valve position with stored malfunction relationships deviating from a target relationship between the amount of the fluid flow and the relative valve position. The controller is adapted for determining and/or identifying at least one of the following malfunctions: leakage within the valve, leakage of at least one flow path of the coupling device, leakage of at least one fluid conducting feature of the revolving valve element, leakage within an interface between the moveable valve element and the coupling device, stricture and/or blockage of a least one flow path of the coupling device, aging of at least one, in particular microfluidic, component of the coupling device, said component arranged within a flow path of the coupling device.

Embodiments might comprise one or more of the following features. A flexible microfluidic chip is used as said coupling device, said microfluidic chip comprising at least one microfluidic component arranged within a flow path of the microfluidic chip. The moveable valve element comprises an arrangement of at least one fluid conducting feature. A flexible test chip is used as said coupling device, said test chip adapted for diagnosing said revolving valve element. A test chip or a frame supporting the test chip comprises an identification-tag, in particular a radio-frequency-chip. The assembly comprises a tag-reader. The controller is adapted for automatically identifying a test chip using a tag-reader. The controller is adapted for rotating the at least one moveable or revolving valve element step by step, wherein each rotary step is followed by a pause. The controller is adapted for measuring at each relative valve position of the moveable or revolving valve element the amount of the fluid flow at a stationary flow state. The controller is adapted for measuring the amount of the fluid flow depending on relative valve positions of the revolving valve element for a full rotation of 360°.

BRIEF DESCRIPTION OF DRAWINGS

Other objects and many of the attendant advantages of embodiments of the present invention will be readily appreciated and become better understood by reference to the following more detailed description of embodiments in connection with the accompanied drawings. Features that are substantially or functionally equal or similar will be referred to by the same reference signs.

DETAILED DESCRIPTION OF THE PREFERRED EMBODIMENT

Figure 1:
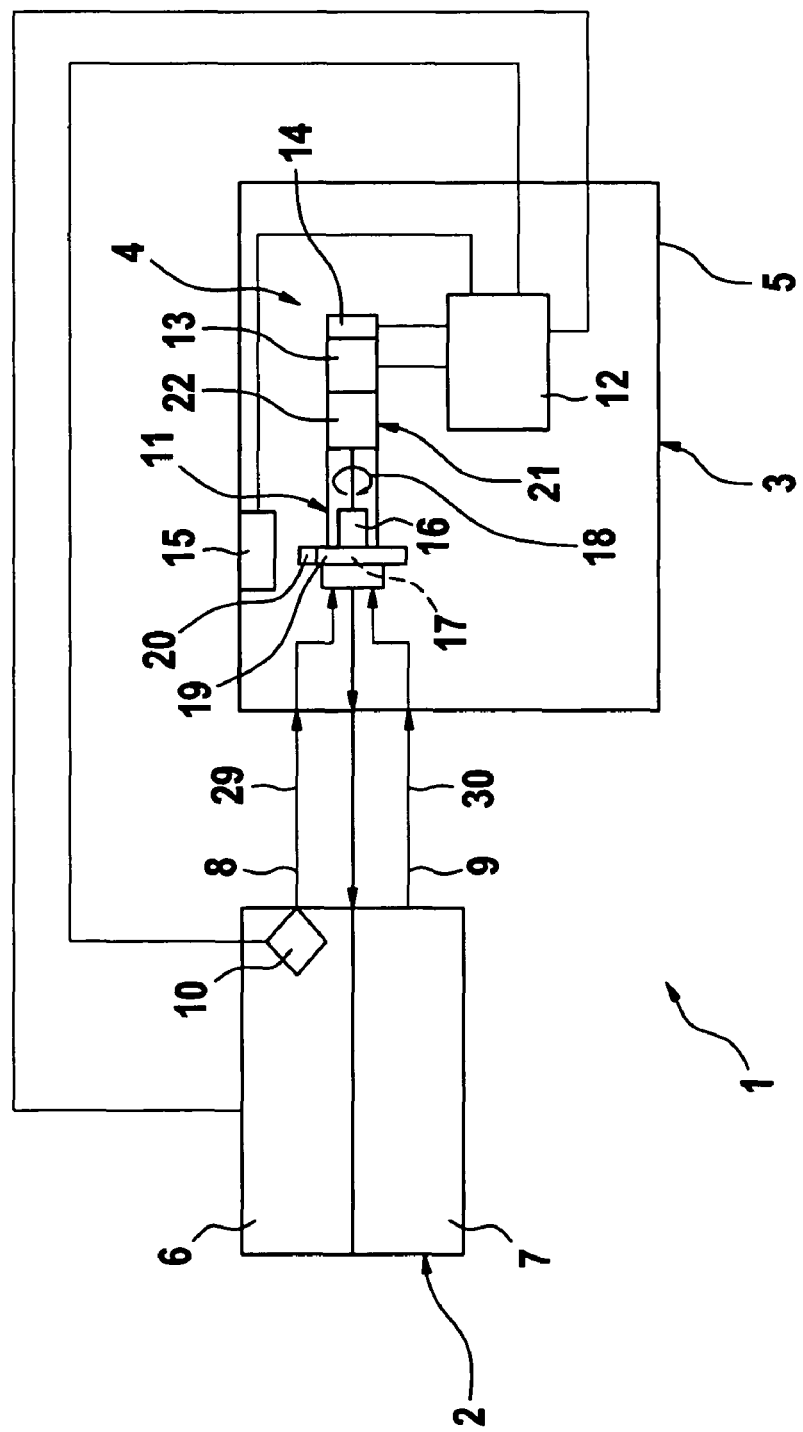
FIG. 1 depicts a simplified schematic view of a fluid separation system, according to embodiments of the invention.

According to FIG. 1 a fluid separation system 1 according to the shown embodiment comprises a fluid provider 2, a separation unit 3 and a fluid handling assembly 4. The assembly 4 could be arranged within a housing 5 of the separation unit 3. The system 1 or its separation unit 3, respectively, is adapted for separating compounds of the fluid, in particular a gas or a liquid. Preferably, the separation unit 3 or the whole system 1 comprises or is a chromatography system, in particular a liquid chromatography system. Common are for example high performance liquid chromatography systems (HPLC). HPLC is a form of chromatography used to separate compounds, that are dissolved in liquid.

The provider 2 is adapted for providing the fluid comprising the compounds to be separated. Therefore, the provider 2 supplies the fluid to the separation unit 3. In the depicted embodiment the provider 2 comprises a nano-pump 6 and a capillary pump 7. Each pump 6, 7 is adapted for supplying the fluid to the separation unit 3. In FIG. 1 this separated fluid supplies are depicted by means of arrows 8 and 9. The nano-pump 6 may be of the type of a nano-pump disclosed in U.S. Pat. No. 6,627,075 B1, which is incorporated herein by reference. Such a nano-pump 6 usually comprises a flow sensor 10 adapted for measurement of a value correlated to the fluid flow supplied to the separation unit 3.

The assembly 4 comprises a valve 11 and a controller 12. In the depicted embodiment, the assembly also comprises an actuator 13, a position sensor 14 and a tag-reader 15 which is preferably also a component of the separation unit 3. The assembly 4 may also comprise a flow sensor 10. Since the provider 2 is provided with the flow sensor 10 of the nano-pump 6 the controller 12 of the assembly 4 preferably is coupled to said flow sensor 10 of the nano-pump 6. Therefore, the flow sensor 10 of the provider 2, in particular of its nano-pump 6, is also the flow sensor of the assembly 4.

The assembly 4 further comprises a fluid supply adapted for supplying a fluid under pressure to at least one port of the valve 11. Since the provider 2 has the same function as such a fluid supply, the controller 12 is coupled to the provider 2 of the system 1. Therefore, the provider 2, in particular its nano-pump 6, is the fluid supply of the assembly 4.

The valve 11 comprises at least one moveable valve element 16 and a coupling device 17. The coupling device 17 comprises at least one port coupled to a flow path and is adapted for interacting with the moveable valve element 16 in order to control a fluid flow through said at least one port by means of a relative valve position between the moveable valve element 16 and the coupling device 17. The movement between the moveable valve element 16 and the coupling device 17 can be a translatory movement. Preferably, said movement is a revolving movement. Therefore, the moveable valve element 16 preferably is a revolving element 16. The revolving movement of the moveable valve element 16 is depicted by an arrow 18. The moveable valve 16 preferably is designed as a revolving valve element 16 disclosed in the aforementioned EP 1 520 837, which is incorporated herein by reference.

The coupling device 17 is preferably designed as a flexible chip comprising the at least one port and the at least one flow path. Said chip could be designed as a test chip or as a microfluidic chip, respectively, which are described more detailed later. Since the coupling device 17 is preferably designed as said chip, said chip and said coupling device are referred to both by the same reference 17.

The chip 17 preferably arranged within a frame 19 adapted for positioning the chip 17 within the frame 19. Said frame 19 is also adapted for using within the separation unit 3 or within the assembly 4, respectively. The frame 19 may comprise a grip member 20 simplifying the handling of the frame 19. The chip 17 or preferably the frame 19 may be provided with at least one identification-tag not shown. Preferably, said identification-tag is designed as a radio-frequency-chip and may be e.g. arranged within the grip member 8. In case the frame 19 or the chip 17 is situated within the assembly 4 or within the system 1 the tag reader 15 and the identification tag interact for providing one-way or bilateral data transmission between the identification-tag and the tag reader 15. The frame 19 is preferably a frame disclosed in unpublished EP Application No. 05 100 768.0, which is incorporated herein by reference.

The actuator 13 is drive coupled to at least one moveable valve element 16 by means of a drive chain 21. The drive chain 21 may comprise a gear 22 and is drive coupled at an input side to the actuator 13 and at an output side to the moveable valve element 16. The controller 12 is coupled to the actuator 13. The controller 12 is adapted to actuate the moveable valve element 16 by actuating the actuator 13, in order to control or adjust the relative valve position.

The position sensor 14 is adapted for measurement of a value correlated to the relative valve position of the moveable valve element 16. Therefore, the position sensor 14 is coupled to the actuator 13. Consequently the position sensor 14 directly measures only the relative actuator position and measures said relative valve position only indirectly. The controller 12 is coupled to the position sensor 14.

The controller 12 is adapted for controlling the relative valve position based on at least one of a current and a previous measurement of an amount of the fluid flow dependent on the relative valve position. The use of such a previous measurement enables the controller 12 to consider a possible off-set of the actuator 13. Said off-set is the result of the indirect measurement of the relative valve position and is caused by manufacturing tolerances within the drive chain 21 coupling the actuator 13 to the moveable valve element 16. Said off-set therefore is defined by a deviation between an actual value and a target value of a relationship between the relative actuator position and the relative valve position. Considering said off-set such tolerances can be reduced or eliminated. Therefore, the use of the previous measurement enables the controller 12 to adjust the moveable valve element 16 accurately.

Preferably, the previous measurement is or at least comprises a calibrated relationship between the amount of the fluid flow and the relative valve position. Such a calibrated relationship considers at least the off-set, mentioned above, of the actuator.

Preferably, the controller 12 is also adapted for performing said previous measurement. To this end the controller 12 is adapted for determining an actual relationship between the amount of the fluid flowing through the at least one port and the relative valve position. Said amount of the fluid flowing through the at least one port is determined by means of the flow sensor 10. The relative valve position is determined (indirectly) by means of the position sensor 14. The controller 12 further is adapted for evaluating said determined actual relationship for diagnostic purposes. One of said diagnostic purposes is the determination of said previous measurement or of the correlating previous measurement data, respectively.

Figure 3:
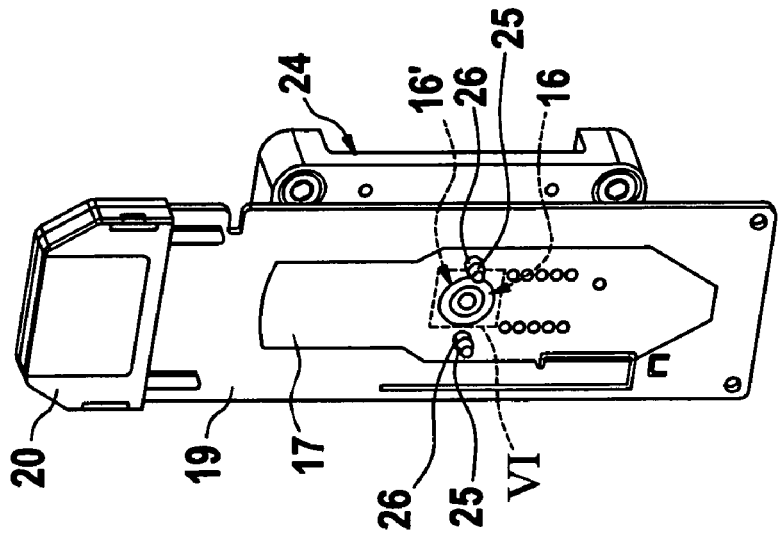
FIGS. 2 and 3 depict perspective views of a valve at different integration statuses.
Figure 2:
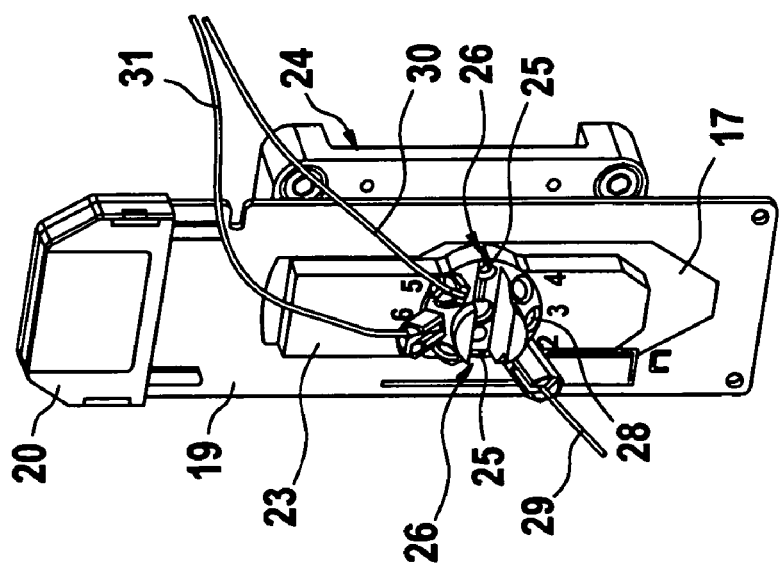

According to the FIGS. 2 and 3 the frame 19 is adapted for positioning the chip 17 between the moveable valve element 16 and an abutment member 23. The moveable valve element 16 is arranged on a carrier element 24 which is a part of the valve 11. The carrier element 24 comprises two positioning pins 25 penetrating corresponding positioning openings 26 of the chip 17. The positioning pins 25 further extend into corresponding receptions 27 of the abutment member 23. The abutment member 23 is also called stator and the moveable valve element 16 is also called rotor.

The revolving valve element 16 comprises an interface with the chip 17. In this interface the revolving vale element 16 is moveable relative to the chip 17. Within this interface the contacted surfaces of the revolving valve element 16 and the chip 17 are pressed together in order to perform a sufficient sealing.

The abutment member 23 is provided with several ports 28 adapted for coupling fluid lines. According to the example of FIG. 2 the abutment member 23 is provided with six ports 28 enumerated from one to six. The second port 28$_2$ is coupled to a nano-pump line 29 leading to the nano-pump 6. The fifth port 28$_5$ is coupled to a capillary pump line 30 leading to the capillary pump 7. The sixth port 28$_6$ is coupled to a waste line 31 leading to the provider 2 or to a reservoir, respectively. The remaining ports 28 of the abutment member 23 can be used e.g. with an embodiment having a second moveable valve element 16' (see FIG. 3 and FIG. 6a to 6f).

Figure 4:
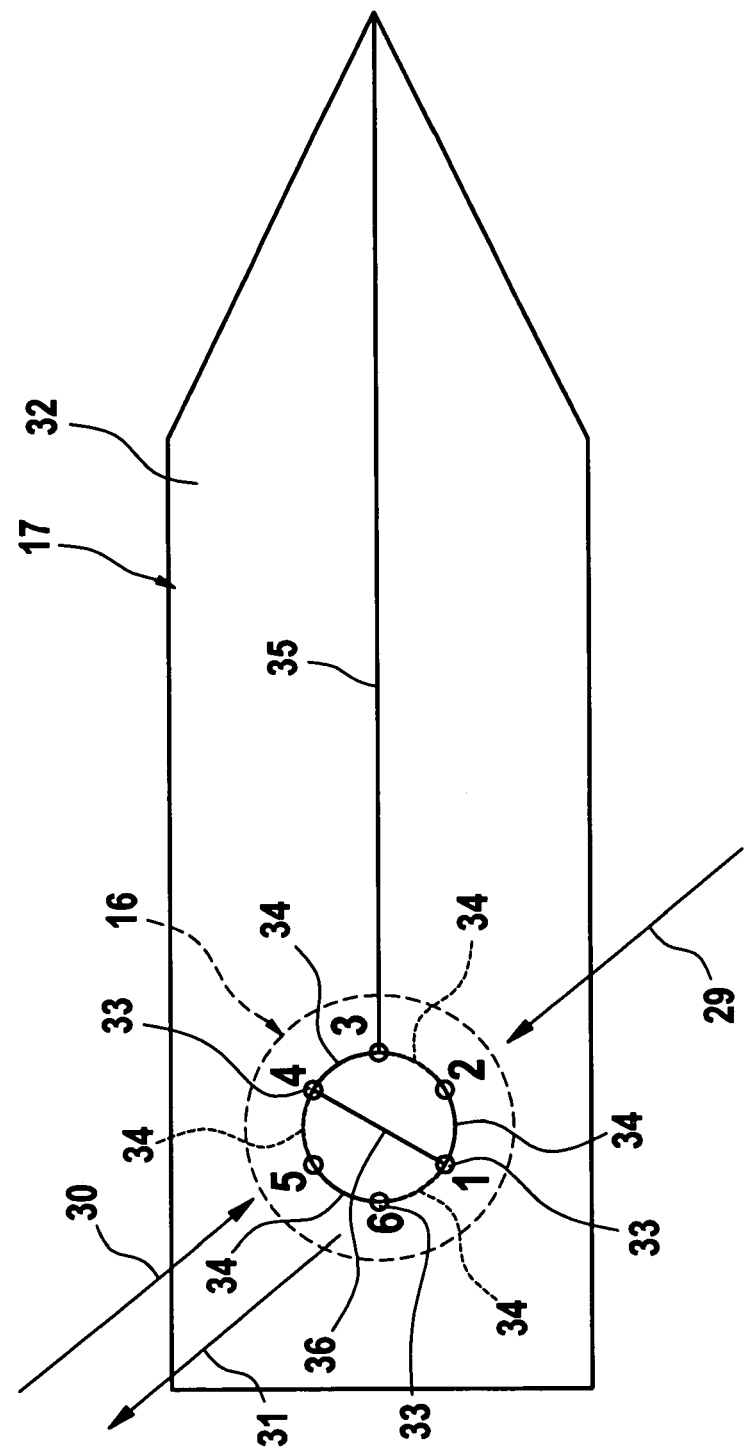
FIG. 4 depicts a schematic view of a microfluidic chip.

According to FIG. 4 the chip 17, which is designed as a microfluidic chip 32, comprises for example six ports 33 enumerated from one to six. In this embodiment the second port 33$_2$, the fifth port 33$_5$ and the sixth port 33$_6$ are designed as through holes. The other ports 33$_1$, 33$_3$, 33$_4$ are only open to the moveable valve element 16. The moveable valve element 16 symbolized by dash lines is provided with fluid conducting features 34 each adapted for connecting two adjacent ports 33, when the moving valve element 16 is adjusted in a respective relative valve position. The microfluidic chip 32 also comprises at least one microfluidic channel 35 which is preferably designed as a so called "separation column". Additionally, the microfluidic chip 32 in this embodiment also comprises another microfluidic channel 36 designed as a so called "trapping column". For more details of the design of such a microfluidic chip 32 see U.S. Pat. No. 5,500,071, which is incorporated herein by reference.

In a load mode the revolving valve element 16 is adjusted in a load relative valve position characterized by dash lines of the fluid conducting features 34. In this load mode the capillary pump 7 supplies fluid through the capillary pump line 30 to the fifth port 32$_5$. The respective fluid conducting feature 34 connects the fifth port 33$_5$ to the fourth port 33$_4$ which is connected to the trapping column 36. Therefore, the fluid flows through the trapping column 36 to the first port 33$_1$ via the respective fluid conducting feature 34 to the sixth port 33$_6$ into the waste line 31. In this load mode the trapping column 36 is enriched with the components to be separated from the liquid.

In a run mode the revolving valve element 16 is adjusted in a run relative valve position characterized by continuous lines of the fluid conductive features 34. In the run mode the nano-pump 6 supplies fluid via the nano pump line 29 through the second port 33$_2$, via the respective fluid conducting feature 34 to the first port 33$_1$, through the trapping column 36 in counter-direction to the fourth port 33$_4$, and via the respective fluid conducting feature 34 to the third port 33$_3$ into the separation column 35.

Figure 5:
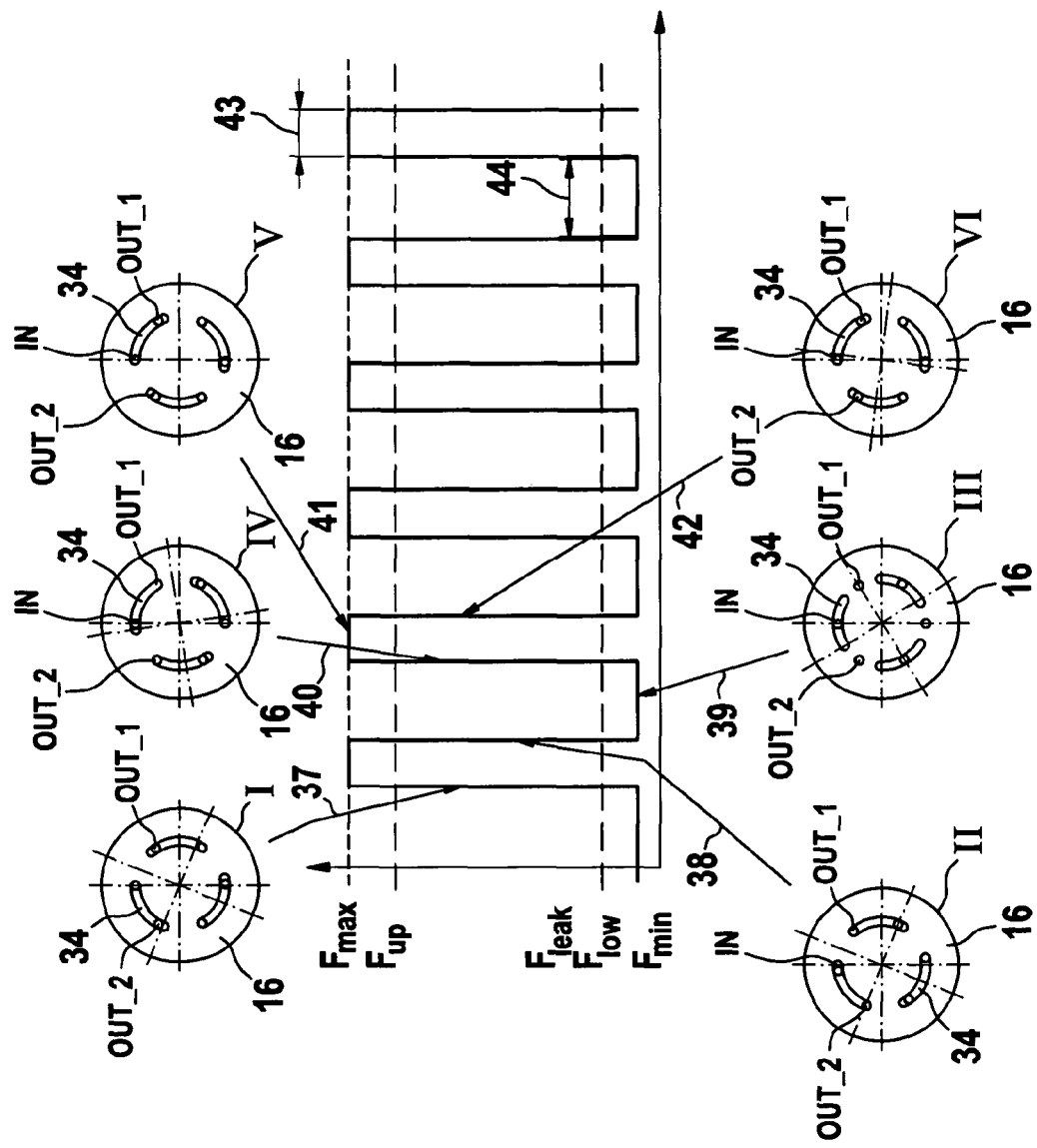
FIG. 5 depicts a diagram showing a chart of a measurement of an amount of a fluid flow dependent on a relative valve position.

As stated above the controller 12 is preferably adapted for controlling the relative valve position dependent on the previous measurement. Said previous measurement can for example be provided by determining a calibrated relationship between the amount of the fluid flow and the relative valve position. Said calibrated relationship considers the off-set of the actuator, i.e. the deviation between the actual value and the target value of the relationship between the relative actuator position and the relative valve position. The controller 12 preferably is adapted for determining the off-set of the actuator 13. FIG. 5 shows an example of a procedure performed by the controller 12 in order to determine the off-set of the actuator 13.

Referring now to FIG. 5 the depicted diagram shows a chart of the dependency between the amount of the fluid flow (ordinate) and the relative valve position (abscise). The values of the relative valve position directly correspond to the values determined by means of the position sensor 14. In case the position sensor 14 is designed as an encoder the values of the relative valve position are encoder counts. Consequently, the encoder counts represent the relative actuator position. FIG. 5 shows pictogram-like pictures I to VI representing six different relative valve positions between the revolving valve element 16 and the respective chip 17. The chip 17 is provided with an inlet port IN, a first outlet port OUT_1 and a second outlet port OUT_2.

In order to perform the calibrating process the controller 12 actuates the provider 2 in order to supply the fluid under pressure to the inlet port IN. The flow sensor 10 determines the amount of the fluid flowing through this inlet port IN. Additionally, the controller 12 actuates the actuator 13 in order to move the moveable valve element 16 relative to the chip 17. The relative actuator position is determined by means of the position sensor 14. The relative valve position correlates to the relative actuator position, but additionally includes automatically the off-set of the actuator 13.

In the situation of picture I one of the fluid conducting features 34 of the revolving valve element 16 starts the fluidic connection between the inlet port IN and the second outlet port OUT_2. The beginning of this connection results in a steep rising edge in the chart according to an arrow 37. The fluid flow rises to a maximum value $F_{max}$. During further rotation of the revolving valve element 16 the liquid flow remains essentially constant until the relative valve position arrives the value correlating to the situation depicted in picture II.

In the situation according to picture II the fluid contacting feature 34 ends the fluidic contact to the second outlet port OUT_2. Consequently, the fluid flow stops, and the chart shows a steep falling edge according to an arrow 38. The fluid flow falls to a minimum value $F_{min}$ which is usually about zero.

During further movement of the revolving valve element 16 the respective fluid conducting feature 34 according to picture III isolates the input port IN with respect to the second outlet port OUT_2 and with respect to the first outlet port OUT_1. Accordingly, the fluid flow remains essentially constant at its minimum value $F_{min}$ according to an arrow 39.

In the situation according picture IV the fluid conducting feature 34 starts contacting the first outlet port OUT_1 to the inlet port IN. Consequently the chart shows another rising edge according to an arrow 40.

During further movement of the revolving valve element 16 the connection between the inlet port IN and the first outlet port OUT_1 remains constant and therefore the fluid flow again remains constant at the maximum value $F_{max}$ according to an arrow 41 and according to picture V.

Further movement of the revolving valve element 16 results in the situation depicted in picture VI in which the respective fluid conducting feature 34 ends the contact to the inlet port IN. The result is another falling edge in the chart. The fluid flow thus falls to its minimum value $F_{min}$ according to an arrow 42.

Preferably, the controller 12 determines the fluid flow for a full rotation of 360° of the revolving valve element 16. Basically, the fluid flow could be determined during continuously rotating the revolving valve element 16. Preferably, the controller 12 is adapted for moving or rotating, respectively, the revolving valve element 16 step by step. Each step is followed by a pause. Said pauses are chosen such that in each step of the relative valve position the fluid flow can establish a stationary flow state. Therefore, the measuring is preferably performed at or in each relative valve position at a stationary flow rate.

In order to determine the off-set of the actuator 13 the controller 12 is adapted for comparing the amount of the fluid flow with at least one of an upper threshold $F_{up}$ and a lower threshold $F_{low}$. By comparing the fluid flow with the thresholds $F_{up}$ and $F_{low}$ the controller 12 is enabled to determine an actual open range 43 and an actual seal range 44. The chart according FIG. 5 shows as an example only one of this open ranges 43 and only one of this seal ranges 44. Each actual open range 43 is characterized by relative valve positions in which the amount of the fluid flow is higher than said upper threshold $F_{up}$. Each actual seal range 44 is characterized by relative valve positions, in which the amount of fluid flow is lower than that lower threshold $F_{low}$. In order to determine the off-set of the actuator 13 the controller 12 is enabled to compare one of said actual open ranges 43 with a corresponding target open range. The off-set of the actuator 13 can also be determined by comparing one of the actual seal ranges 44 with a corresponding target seal range. Said target open range or target seal range, respectively, is a theoretic open range or a theoretic seal range, respectively, which would occur when the manufacturing of the fluid conductive features 34, the revolving valve element 16, the actuator 13 and the drive coupling between the actuator 13 and the revolving element 16 could be performed with zero tolerances.

After determining the off-set of the actuator 13 the controller is enabled to perform the controlling of the relative valve positions by considering the determined off-set of the actuator 13. This is one option for evaluating the determined actual relationship between the fluid flow and the relative valve position.

Another option for evaluating the determined actual relationship for diagnostic purposes is determining a malfunction of at least one of the valve 11, the moveable valve element 16 and the coupling device 17. A malfunction that could be detected by the controller 12 is, for example, leakage of the valve 11. Therefore, the controller 12 is adapted for comparing the fluid flow of the chart with a leakage threshold $F_{leak}$. To this end the controller 12 compares the fluid flow with the leakage threshold $F_{leak}$ within a range of relative valve positions in which a sealing range 44 is expected. When the fluid flow within said sealing range 44 is higher than the leakage threshold $F_{leak}$ the controller 12 determines leakage. In the example of FIG. 5 the leakage threshold $F_{leak}$ has the same value as the lower threshold $F_{low}$.

Other malfunctions that could be determined by the controller 12 could be at least one of the following. Leakage within the valve 11, leakage of at least one flow path of the coupling device 17, leakage of at least one fluid conducting feature 34 of the moving valve element 16, leakage within an interface provided between the revolving valve element 16 and the chip 7, stricture and/or blockage of at least one flow path of the coupling device 17 and edging of at least one, in particular microfluidic, component of the coupling device 17, said component arranged within a flow path of the coupling device 17. Examples for such components are the separation column 35 and the trapping column 36.

In order to determine such malfunctions the controller 12 is adapted for comparing the actual relationship between the amount of fluid flow and the relative valve position with a target relationship. Said target relation ship is for example a relationship previously determined which is defined as the target relationship by an operator of the system 1.

The controller 12 is further adapted for determining malfunctions, said malfunctions are characterized by deviations between the actual relationship and the target relationship.

Additionally the controller 12 can be adapted for identifying determined malfunctions by comparing the actual relationship with stored malfunction relationships. To this end the controller 12 may have access to a set of different malfunction relationship preferably stored in a suitable storage. Each malfunction relationship characterizes a certain malfunction. For example, if the separation column 35 is locked, the determined actual relationship between the fluid flow and the relative valve position shows a significant deviation from the expected target relationship.

Basically, the determination of the actual relationship between the fluid flow and the relative valve position, the determination of the off-set of the actuator 13 and the determination of at least one malfunction can be performed by means of a conventional microfluidic chip 32. Additional malfunctions and numerous other diagnostics can be performed by means of a test chip 45 (see FIGS. 6a to 6e) which is specially adapted for diagnostic purposes. The test chip 45 and the microfluidic chip 32 are made of a flexible material, in particular plastics or synthetics.

The FIGS. 6a to 6e show an example for such a test chip 45 adapted for performing several flow tests and seal tests in an assembly 4 comprising two revolving valve elements 16 and 16'. The revolving valve element 16,16' are arranged coaxially and are provided with several fluid conducting features 34 and 34'.

The test chip 45 comprises one inlet port 46 connected to the nano-pump 6 via the nano-pump line 29 and an outlet port 47 connected to the waste line 31. The inlet port 46 and the outlet port 47 are open to the abutment element 23 and do not penetrate the test chip 45. The test chip 45 further comprises several connecting ports 48 situated according to a special layout which is adapted to the layout of the fluid conducting features 34 and 34' of the revolving valve elements 16, 16'. Each of this connecting ports 48 is open to the respective revolving valve element 16, 16' and does not penetrate the test chip 45. The test chip 45 also comprises two flow paths, namely an inner flow path 49 and an outer flow path 50. The inner flow path 49 is coupled to the inlet ports 46 and to several of the connecting ports 48. The outer flow path 50 is coupled to the outlet port 47 and to the remaining connecting ports 48. The expressions "inner" and "outer" prefer to the radial position of the two flow paths 49, 50. Both flow paths 49, 50 are arranged within the test chip 45.

Actually, in this embodiment the inner flow path 49 comprises eight of such connecting ports 48, namely three inner ports 48 applied to the first revolving valve element 16 and five outer ports 48 applied to the second revolving valve element 16'. The outer flow path 50 comprises only seven connecting ports 48, namely two inner ports 48 applied to the first revolving valve element 16 and five outer ports 48 applied to the second revolving valve element 16'.

Figure 6A:
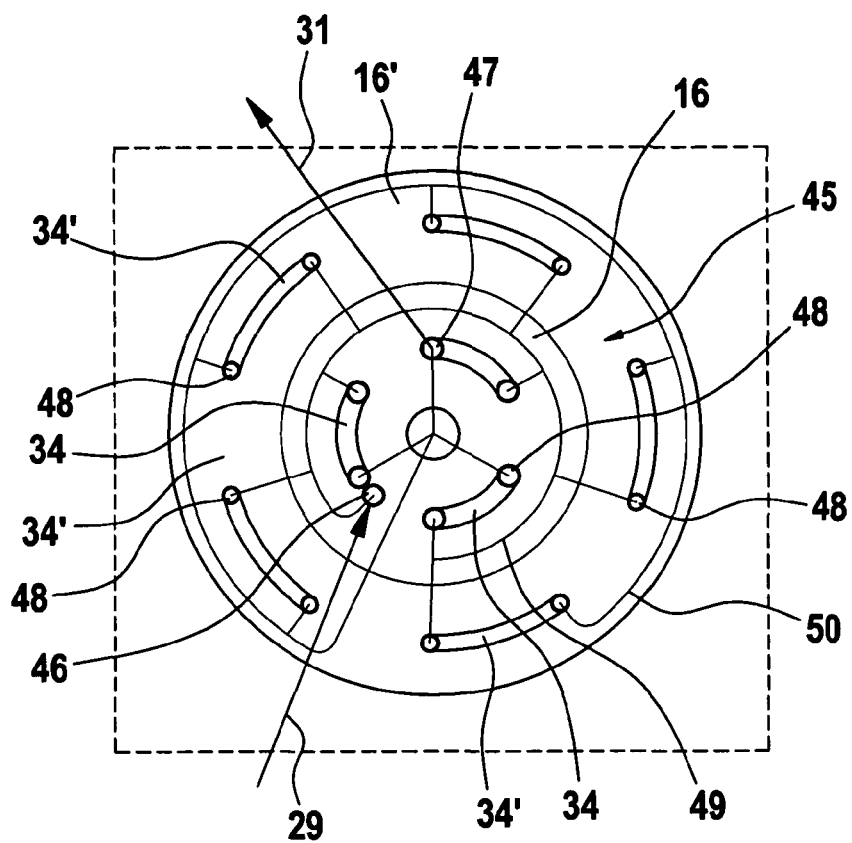
FIG. 6a to 6e depict an enlarged detail VI in FIG. 3 of a test chip.

In the relative valve position depicted in FIG. 6a a flow test of the inner flow path 49 and the outer flow path 50 can be performed. In this position the two flow paths 49, 50 are connected in serial via the fluid conducting features 34, 34'. In this situation the outer ports 48 of the first revolving valve element 16 are connected to the outer ports 48 of the second revolving valve element 16' by means of the fluid conducting features 34' of the second revolving valve element 16'. Additionally, the inner ports 48 of the first revolving valve element 16 are connected to the inner ports 48 of the second revolving valve element 16' and to the outlet port 47 by means of the fluid conducting features of the first revolving valve element 16.

Figure 6B:
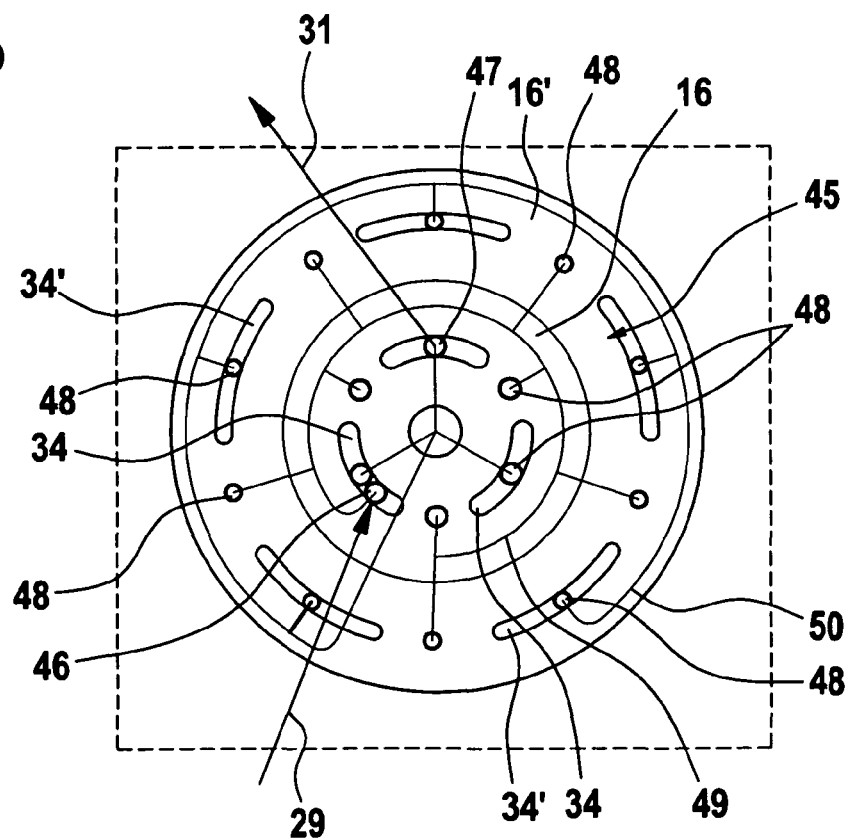

In the relative valve position according to FIG. 6b a seal test of the inner flow path 49 can be performed. In this relative position the outlet port 47 and all of the connecting ports 48 are blocked; only the inlet port 46 is permanently connected with the nano-pump 6. The fluid conducting features 34' of the second revolving valve element 16 are only connected to the outer connecting ports 48 of the outer flow path 50. The fluid conducting features 34 of the first revolving valve element 16 are only connected to the inner connecting ports 48 of the inner flow path 49.

Figure 6C:
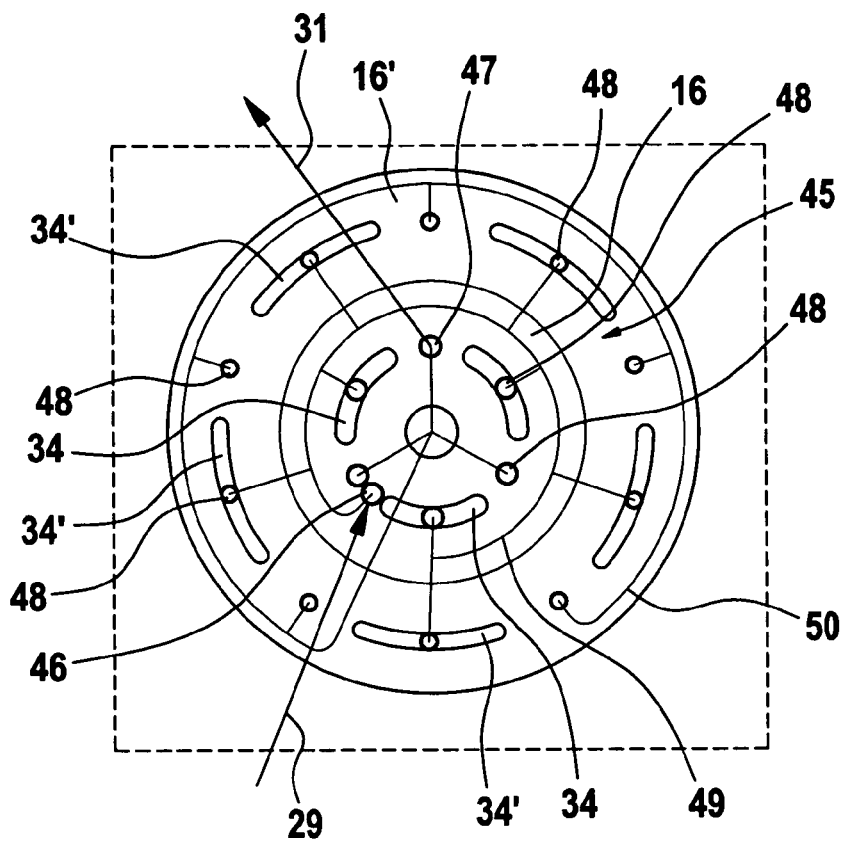

In the situation of FIG. 6c a seal test of the inner flow path 49 and the outer flow path 50 can be performed. In this relative valve position all fluid conducting features 34 and feature 34' are connected only to the connecting ports 48 of the inner flow path 49.

Figure 6D:
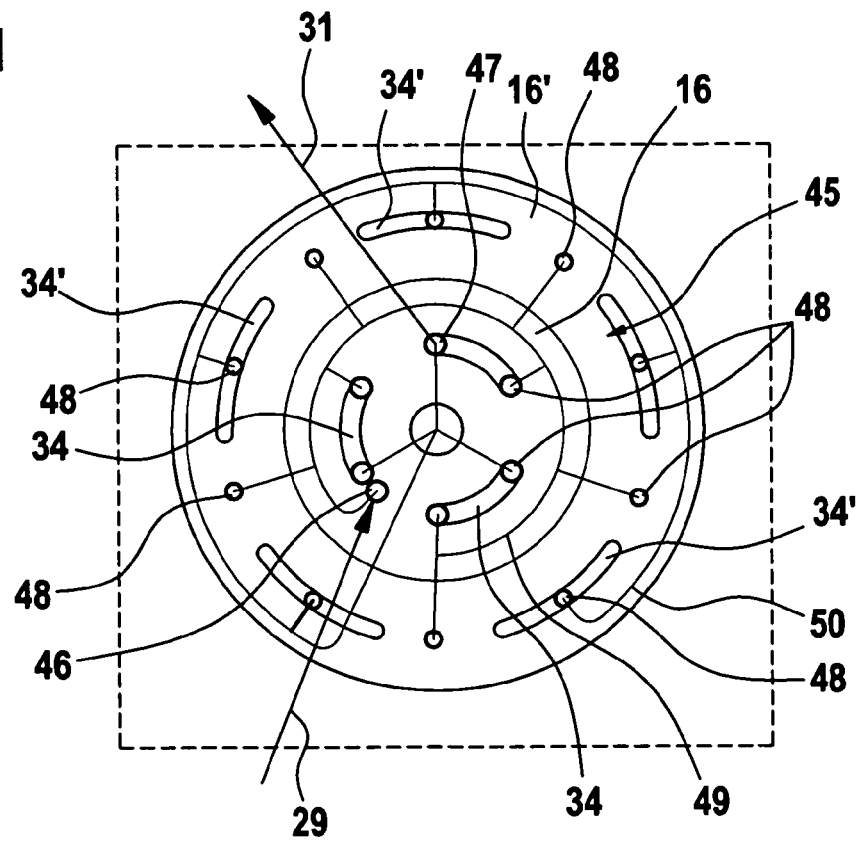

In the situation according to FIG. 6d a flow test of only the inner flow path 49 can be performed. To this end a relative valve position is adjusted in which the fluid conducting features 34 of the first revolving element 16 connect the inner ports 48 of the inner flow path 49 to the outlet port 47 and to the inner ports 48 of the outer flow path 50. The outer ports 48 of the inner flow path 49 and the outer ports 48 of the flow path 50 are blocked.

Figure 6E:
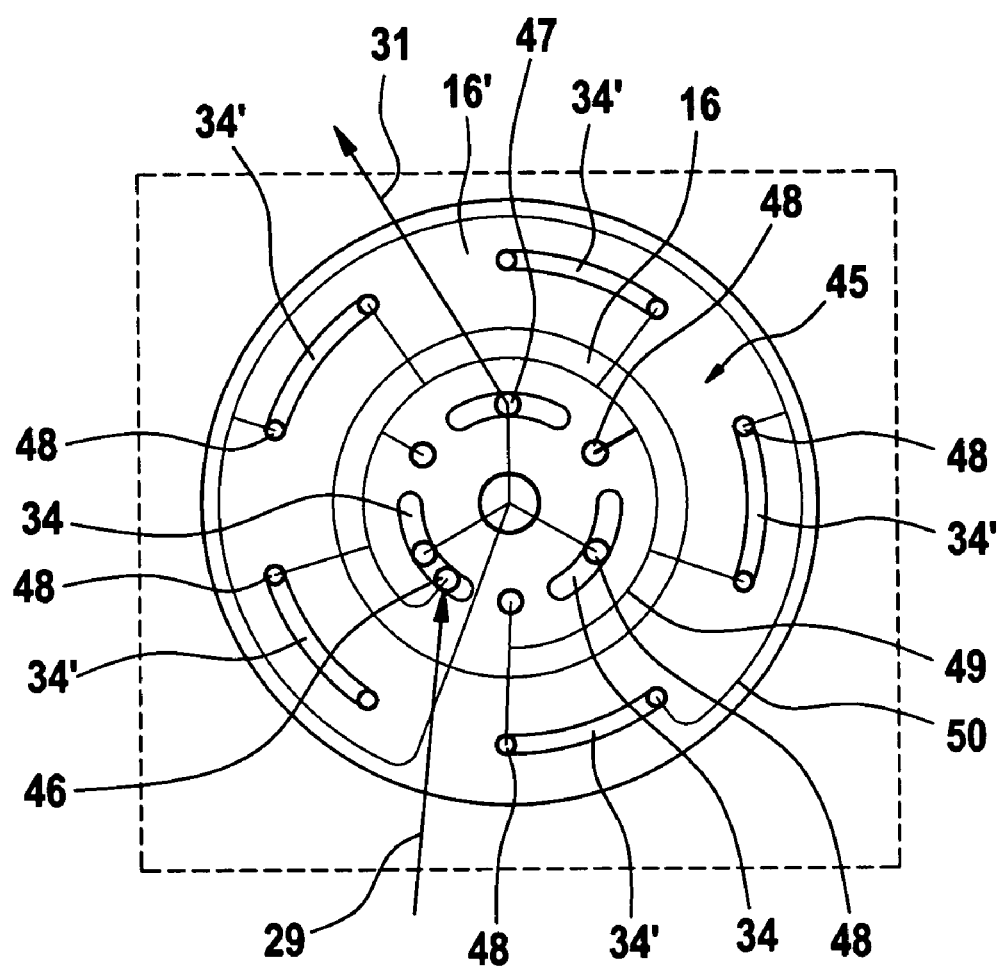

In the situation depicted in FIG. 6e the controller 12 is enabled to perform a flow test for the outer flow path 50 only. In this revolving valve position the outer ports 48 of the inner flow path 49 and the outer ports 48 of the outer flow path 50 are connected by means of the fluid conducting features 34' of the second revolving valve element 16'. The inner ports 48 of the inner flow path 49 are blocked.

When such a test chip 45 is arranged within the frame 19 provided with an identification-tag mentioned above, the controller 12 is preferably adapted for automatically identifying the test chip 45 by means of the tag reader 15.

In order to implement the aforementioned features into the controller 12 the controller 12 is preferably provided with a software program. Said software program is adapted for controlling or executing the above described methods and or procedures according to the described embodiments. Said controller 12 therefore comprises or is designed as a data processing system such as a microprocessor or as a computer.

What is claimed is:

1. A liquid separation system adapted for separating compounds of a liquid, comprising:
   a liquid provider adapted for providing the liquid,
   a separation unit adapted for separating compounds of the liquid, and
   an assembly comprising:
      a valve having
         at least one revolving valve element; and
         a coupling device having at least one port coupled to a flow path,
         wherein said revolving valve element is rotatable to control the amount of liquid flow through said at least one port, the amount of liquid flow being dependent on a relative valve position between the revolving valve element and the coupling device, and
      a controller configured for performing a calibration procedure to determine relative valve positions of an open range valve position providing a fluid flow higher than a predetermined upper threshold, and a seal range valve position providing a fluid flow of about zero, wherein the controller is further configured to control the revolving valve element to move between the determined open range valve position and the determined seal range valve position.

2. The liquid separation system according to claim 1, further comprising:
   an actuator that actuates the at least one revolving valve element via a drive chain, and
   wherein the controller rotates the revolving valve element by actuating the actuator.

3. The liquid separation system according to claim 1, wherein the relative valve position between the revolving valve element and the coupling device comprises a calibrated relationship between the amount of liquid flow and the relative valve position.

4. The liquid separation system according to claim 1, wherein the relative valve position between the revolving valve element and the coupling device considers an off-set of an actuator, said off-set being defined by a deviation between an actual value and a target value of a relationship between a relative actuator position and the relative valve position.

5. The liquid separation system according to claim 1, further comprising:
   a flow sensor adapted for measurement of the amount of the liquid flow through the at least one port.

6. The liquid separation system according to claim 1, further comprising:
   a position sensor adapted for measurement of a value correlated to the relative valve position.

7. The liquid separation system according to claim 1, wherein the controller is adapted for determining an actual relationship between the amount of the liquid flowing through the at least one port and the relative valve position.

8. The liquid separation system according to claim 1, wherein
   the controller is adapted for determining leakage within the valve characterized by amounts of liquid flow which are higher than a leakage threshold.

9. The liquid separation system according to claim 1, wherein
   the controller is adapted for comparing an actual relationship between the amount of liquid flow and the relative valve position with a target relationship between the amount of the liquid flow and the relative valve position, and
   the controller is preferably adapted for determining malfunctions of at least one of the valve and the coupling device, such malfunctions being characterized by deviations between an actual relationship and a target relationship between the amount of the liquid flow and the relative valve position.

10. A method for handling a liquid in an assembly comprising
    a valve having
       at least one revolving valve element, and
       a coupling device having at least one port coupled to a flow path,
    wherein said revolving valve element is rotatable to control the amount of liquid flow through said at least one port, the amount of liquid flow being dependent on a relative valve position between the revolving valve element and the coupling device,
    the method comprising:
       performing a calibration procedure to determine relative valve positions of an open range valve position providing a fluid flow higher that a predetermined upper threshold, and a seal range valve position providing a fluid flow of about zero;
       controlling the revolving valve element to move between the determined open range valve position and the determined seal range valve position;
       supplying liquid under pressure to the at least one port;

rotating the at least one revolving valve element of the valve to the known relative valve position;
measuring the amount of the liquid flow through the at least one port depending on the relative valve position; and
evaluating the measurement for diagnostic purposes.

11. A software program or product, stored on a non transitory data carrier, for controlling or executing the method of claim 10, when run on a data processing system.

* * * * *